(12) United States Patent
Barraci et al.

(10) Patent No.: US 9,643,737 B2
(45) Date of Patent: May 9, 2017

(54) SOUND AND SCENT SEARCH ENGINE FOR MECHANICS

(71) Applicant: THE BOEING COMPANY, Chicago, IL (US)

(72) Inventors: Nima Barraci, Hessen (DE); Jendrick Westphal, Weiterstadt (DE); Niels-Holger Stark, Roedermark (DE); Merian Kindermann, Neu Isenburg (DE)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/830,380

(22) Filed: Aug. 19, 2015

(65) Prior Publication Data
US 2017/0050750 A1 Feb. 23, 2017

(51) Int. Cl.
  *G07C 5/00* (2006.01)
  *B64F 5/00* (2017.01)
  *G07C 5/08* (2006.01)
(52) U.S. Cl.
  CPC ............ *B64F 5/0045* (2013.01); *G07C 5/006* (2013.01); *G07C 5/085* (2013.01); *G07C 5/0808* (2013.01); *G07C 5/0825* (2013.01)
(58) Field of Classification Search
  CPC combination set(s) only.
  See application file for complete search history.

(56) References Cited

U.S. PATENT DOCUMENTS

| | | | |
|---|---|---|---|
| 2007/0256499 A1* | 11/2007 | Pelecanos | G01H 1/00 73/579 |
| 2008/0257047 A1* | 10/2008 | Pelecanos | G01H 1/00 73/587 |
| 2013/0274991 A1* | 10/2013 | Cheriere | B64F 5/0081 701/32.9 |
| 2013/0274992 A1* | 10/2013 | Cheriere | B64F 5/0081 701/32.9 |
| 2014/0121885 A1* | 5/2014 | Schoonveld | G06Q 10/10 701/29.3 |
| 2014/0279707 A1* | 9/2014 | Joshua | G06Q 30/0283 705/400 |
| 2015/0188961 A1* | 7/2015 | Ricci | H04L 63/10 709/219 |
| 2015/0243109 A1* | 8/2015 | Tseng | G07C 5/00 701/29.1 |

* cited by examiner

*Primary Examiner* — Yonel Beaulieu
(74) *Attorney, Agent, or Firm* — Patterson + Sheridan, LLP (57) ABSTRACT

Method, apparatus, and computer program product for providing a cause of a scent and/or sound detected during operation of a vehicle are provided. In the event a vehicle operator hears a sound or smells a scent while operating a vehicle, a microphone can sample the sound and/or an electronic nose can sample the scent. A sound and/or scent profile is generated from the sampled sound and/or sampled scent. The generated sound and/or scent profile are compared to known sound and/or scent profiles stored in a data structure. In the event the generated sound and/or scent profile matches a known sound and/or scent profile, the data structure is checked for correspondences between the matched, known sound and/or scent profile and a cause of the sound and/or scent. In the event a correspondence to a cause exists, then the cause is output to a user to identify the cause of the sound and/or scent.

20 Claims, 6 Drawing Sheets

SOUND AND SCENT SEARCH ENGINE FOR MECHANICS

BACKGROUND

Aspects described herein relate to event diagnostics, and more specifically, to identifying a sound profile or scent profile to identify a known event.

SUMMARY

According to one aspect, a system for diagnosing events includes an input operable to receive electronic data that includes a scent profile. The system also includes a computer-readable storage medium that stores a data structure. The data structure stores known scent profiles and correspondences between known scent profiles and known events. The system also includes a display. The system also includes a computer processor. The computer processor is operable to search the data structure for at least one known scent profile that matches a received scent. The computer processor is also operable to output to the display an indication of one or more events corresponding to the matched known scent profile upon finding a match between a known scent profile and the received scent profile.

According to one aspect, a computer-implemented method includes receiving electronic data that includes at least one scent profile. The computer-implemented method also includes comparing the received at least one of a scent profile to electronic data containing known scent profiles. The computer-implemented method also includes outputting an indication of one or more events corresponding to the matched known scent profile upon finding a match between a known scent profile and the received scent profile.

According to one aspect, a computer program product for diagnosing events includes a computer-readable storage medium having computer-readable program code embodied therewith. The computer-readable program code is executable by one or more computer processors to receive electronic data that includes at least one scent profile. The computer-readable program code is also executable to compare the received at least one of a scent profile and sound profile to electronic data containing known scent profiles. The computer-readable program code is also executable to output an indication of one or more events corresponding to the matched known scent profile upon finding a match between a known scent profile and the received scent profile.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

In various aspects described herein, vehicle operators are provided with sensors (e.g., an electronic nose and/or a microphone) that can detect scents and/or sounds in (1) an environment of the vehicle, such as a flight deck of an aircraft, a passenger compartment of a vehicle, or the like, or (2) an environment of a structure. Examples of such structures include, but are not limited to buildings, oil rigs, bridges, and tunnels. In various aspects, the sensors could be arranged around an exterior of the vehicle, such as around the engines or the landing gear. In the event the vehicle operator smells or hears something, the pilot uses the sensors to sample the scents or smells. The sampled scents are converted into a scent profile (i.e., a scent fingerprint) and the sampled sounds are converted into a sound profile (i.e., a sound fingerprint). The scent and/or sound profiles are compared to profiles in a data structure (e.g., a database). In various instances, the causes of certain scents and/or sounds may be known. In such instance, profiles for the certain scents and/or sounds in the data structure can include known correspondences with the faults, failures, and/or other events causing the scent and/or sound. If the scent and/or sound profile(s) generated from the sampled scent and/or sound match a profile with a known correspondence to a cause, then the cause can be displayed to a user (e.g., a maintenance employee) so that the user can take action, if necessary, to correct the fault or other event.

Figure 1:
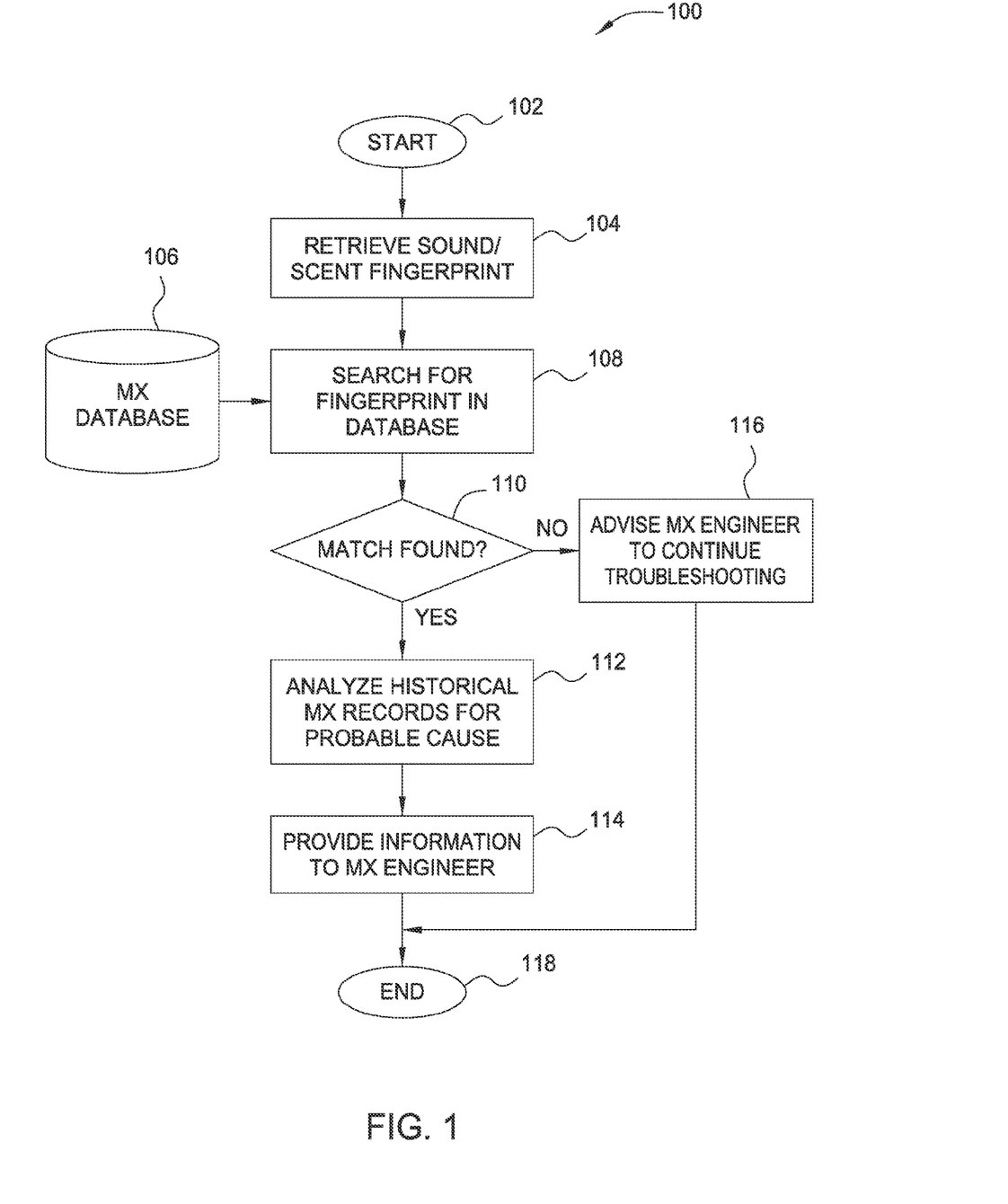
FIG. 1 is a flow chart of a method for providing identifying information for a fault, based on a scent and/or a sound associated with the fault, according to at least one aspect.

FIG. 1 illustrates a flowchart for providing information to a user (e.g., a maintenance engineer) related to a fault or other event, based on a scent and/or sound profile (also referred to as a scent fingerprint and/or sound fingerprint) generated by an electronic nose and/or a microphone. After the method 100 starts at block 102, a sound and/or scent profile is received in block 104. A sound profile can be generated from a recording of the sound gathered by a microphone. The microphone could be built into an environment (e.g., a cockpit of an aircraft) or could be included in a handheld device, such as a smart phone, provided to the vehicle operator. The sound profile is a condensed digital summary, deterministically generated from an audio signal, that can be used to identify an audio sample or quickly locate similar sounds in an audio database. The scent profile can be provided by an electronic nose or the like, such as the HERACLES Flash Gas Chromatography Electronic Nose from Alpha MOS. The electronic nose could be incorporated into an environment (e.g., a cockpit of an aircraft) or could be included in a handheld device, such as a dedicated portable device. In various aspects, the electronic nose could be a separate unit that is connectable to a general device, such as a smartphone running an application. For example, an electronic nose could be connected to the smartphone. The scent profile is a condensed digital summary, deterministically generated from an air sample, that can be used to identify a scent or quickly locate similar scents in a database. For example, the scent profile could identify one or more chemical molecules that are present in the air sample as well as absolute and/or relative concentrations of each molecule.

In an exemplary scenario, a pilot may hear an unfamiliar noise and/or smell an unfamiliar scent on the flight deck of an aircraft and could activate a microphone and/or electronic nose to capture an audio recording of the sound and/or an air sample of the scent. The audio recording and/or scent sample could then be converted into a sound profile and/or a scent profile. In various aspects, the pilot could activate sensors attached to a smart phone, tablet computer, or the like using an application running on such a device. In various other aspects, the pilot could activate sensors that are built into the aircraft. For example, a microphone and electronic nose could be provided on the flight deck, and the pilot(s) could activate the microphone and electronic nose by pushing a button, toggling a switch, or the like. In various aspects, the microphone and/or electronic nose could always be active (e.g., always detecting sounds and/or scents) and could create new sound and scent profiles whenever a new or different sound and/or scent is detected. In various aspects, a maintenance technician, an engineer, or another person tasked with resolving issues with the aircraft could carry a mobile device, similar or identical to the one carried by the pilot, to record sound profiles and/or scent profiles. In various aspects, persons who are otherwise not affiliated with maintenance could use such a mobile device. For example, flight attendants or gate agents could be directed to take a scent and/or sound sample to assist maintenance personnel rapidly diagnose a issue.

After the sound and/or scent profile has been received, in block 108, a database 106 can be searched for a stored sound and/or scent profile that matches the received sound and/or scent profile. In block 110, if a match is found, an event, fault, or the like that corresponds to the matching stored sound and/or scent in the database 106 can be retrieved. In block 114, information related to that event, fault, or the like can be displayed to a user, such as a maintenance engineer. In the event that no match is found, in block 116, the user can be advised to continue troubleshooting the problem. In block 118, the method 100 ends.

As discussed above, the database 106 (e.g., a maintenance (MX) database) can store profiles for sounds and scents that have been encountered in the past. In instances in which a sound profile and/or scent profile has a known cause, the database can include a correspondence between the sound profile and/or scent profile and the event, fault, failure, or the like that caused the sound and/or scent. The database 106 can be updated over time as new sound profiles and/or scent profiles are generated. Some of the sound profiles and/or scent profiles may not have a known cause. In such instances, the sound profile and/or scent profile can be included in the database 106 but without any correspondences to any events. If a cause for the sound profile and/or scent profile is eventually discovered, then the database 106 can be updated to add a correspondence to the event, fault, failure, or the like that caused the sound and/or scent.

Figure 2:
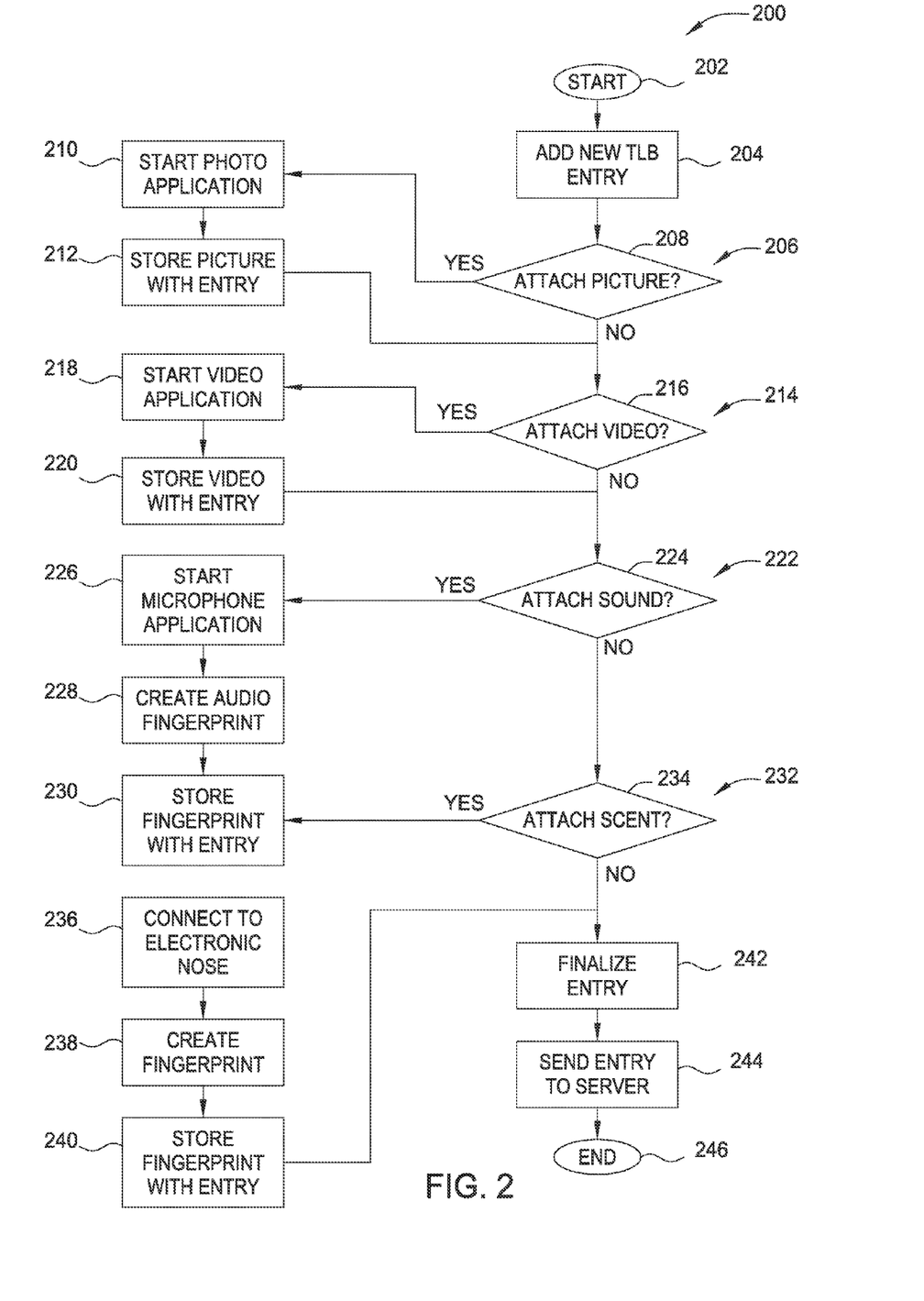
FIG. 2 is a flow chart of a method for collecting sound data, scent data, and/or picture data for subsequent use in identifying an event associated with the sound and/or scent, according to at least one aspect.

FIG. 2 illustrates a flowchart for a method 200 by which a portable device or other system can create an entry (e.g., a maintenance entry) that includes at least one of a sound profile and/or a scent profile. As discussed below, the entry could also include a photo and/or a video to provide visual data to support the sound profile and/or scent profile. After the entry is created, it is sent for searching against a database of known sounds and/or scents, as discussed above with reference to FIG. 1. After the method 200 starts at block 202, a new entry can be created in block 204. For example, in the context of commercial aircraft, the entry may be a technical logbook (TLB) entry. The method 200 includes four sub-steps: a first sub-step 206 for attaching a picture to a an entry, a second sub-step 214 for attaching a video to the entry, a third sub-step 222 for attaching a sound profile to the entry, and a fourth sub-step 232 for attaching a scent profile to the entry. The four sub-steps may be performed in any order, and some of the sub-steps may not be performed, depending on the circumstances, in particular aspects.

In the first sub-step 206, a picture may be attached to the created entry. In block 208, a decision is made whether to attach a picture corresponding to a location of the scent and/or sound to the entry. The decision could depend on whether a camera is available to capture such a picture. For example, in aspects in which a system is based on a mobile smart phone or on a dedicated mobile device, a camera may be included. Alternatively, aspects in which a microphone and/or electronic nose are incorporated into a vehicle, a camera may not be available. In the event that a camera is available and a decision is made to include a picture with the entry, in block 210, a photo application is started and a digital image is captured. In various aspects, a picture can be automatically captured in connection with the sound being recorded and/or a scent being recorded. For example, in block 226, when a microphone is recording a sound, a picture may be taken when the sound is the loudest (i.e., when the microphone recording the sound is closest to the source of the sound) or when a scent is the strongest (i.e., when the electronic nose is closest to the source of the scent). The picture may provide a maintenance worker with a visual clue of the likely whereabouts of the cause of the scent and/or sound. For example, suppose that a pilot detects a burning smell in the cockpit and uses a handheld device to sample an air volume in the cockpit. An electronic nose of the handheld device may detect a chemical molecule in the air consistent with wire insulation burning (e.g., due to an electrical short). While the chemical molecule, identified in the scent profile, identifies what is burning, the scent profile alone may not provide sufficient information for the maintenance worker to efficiently find the source of the burning smell. For example, the commercial aircraft may contain several miles of electrical wire and a maintenance worker may need to inspect significant lengths of that wire before discovering the source of an electrical short or the like. However, if the technical log book entry includes a picture taken when the device determined the scent to be the strongest, the maintenance worker may be able to narrow his investigation to a location or region identified in the picture and find the problem faster. In block 212, the captured picture is stored as part of the entry.

After the picture is captured in block 212 (or not if it is determined to not to capture a picture in block 208), the method 200 moves to sub-step 214. In block 216 of the second sub-step 214, a determination is made whether to attach a video. Again, the decision whether to attach a video could depend on whether a camera is available to capture such a video. In the event that the camera is available and a decision is made to include a video with the entry, in block 218, a video application is started and a video is captured. The video could provide a maintenance worker with a visual clue of the likely whereabouts of the cause of the scent and/or sound. Again, the video may enable a maintenance worker to narrow his investigation to a location or region identified in the video to find the problem faster. In various aspects, a marker or other identifier could be added to the video image to identify the moment or moments when a detected scent or sound is strongest. For example, an icon could be added to the video recording when the detected scent or sound is strongest. As another example, a particular video frame captured when or closest in time to when the detected scent or sound is strongest could be stored as part of the video and also separately stored as a still image (e.g., according to the steps described above with reference to sub-step 206). In block 226, the video that is captured is stored as part of the entry.

After the video is captured in block 220 (or not if it is determined to not take a video in block 216), the method 200 moves to sub-step 222. In sub-step 222, a sound profile can be attached to the created entry. In block 224 of the sub-step 222, a determination can be made whether to attach a sound profile to the created entry. For example, in various aspects, a sound profile may be created whenever a pilot or other vehicle operator presses a button (or touches an icon on a touchscreen display) to record an event being perceived by the vehicle operators. If a determination is made to attach a sound profile to the entry in block 224, then a microphone application can be started in block 226. The microphone application can record a sound event or a portion of a sound event. In block 228, the recording of the sound event or the portion of the sound event can be converted to a sound profile. In block 230, the sound profile can be stored with or otherwise attached to the created entry. In various aspects, the entire recorded sound event could be stored with the created entry. A recording of the entire event could provide extra data for determining the cause of an event. For example, the sound could be correlated to other events. For example, a sound may be loudest when the vehicle is traveling at sixty miles per hour.

After the audio is stored or attached to the created entry (or not if it is determined to not to attach a sound profile to the created entry), the method 200 moves to sub-step 232. In sub-step 232, a scent profile can be attached to the created entry. In block 234 of the sub-step 232, a determination can be made whether to attach a scent profile to the created entry. For example, in various aspects, a scent profile may be created whenever a pilot or other vehicle operator presses a button to record an event being perceived by the vehicle operators. If a determination is made to attach a scent profile in block 234, then an electronic nose can be used in block 236 to record scents from an air sample. In block 238, the recorded scents can be converted to a scent profile. In block 240, the scent profile can be stored with the created entry. In various aspects, the recorded scents over a period of time can be stored with the entry. For example, the air could be sampled every fifteen seconds and a scent profile could be generated and stored with the entry for each air sample. Such sampling could provide extra data for determining the cause of an event. For example, a scent could be correlated to other events. For example, a certain scent could be strongest when the exhaust gas temperature (EGT) is between 800° C. and 870° C.

In block 242, the entry can be finalized with the attached scent profile, sound profile, and/or any picture or video. Thereafter, in block 244, the entry can be sent to a server or other device that includes a database (e.g., the database 106 in FIG. 1) of known scent profiles and/or sound profiles.

Figure 3:
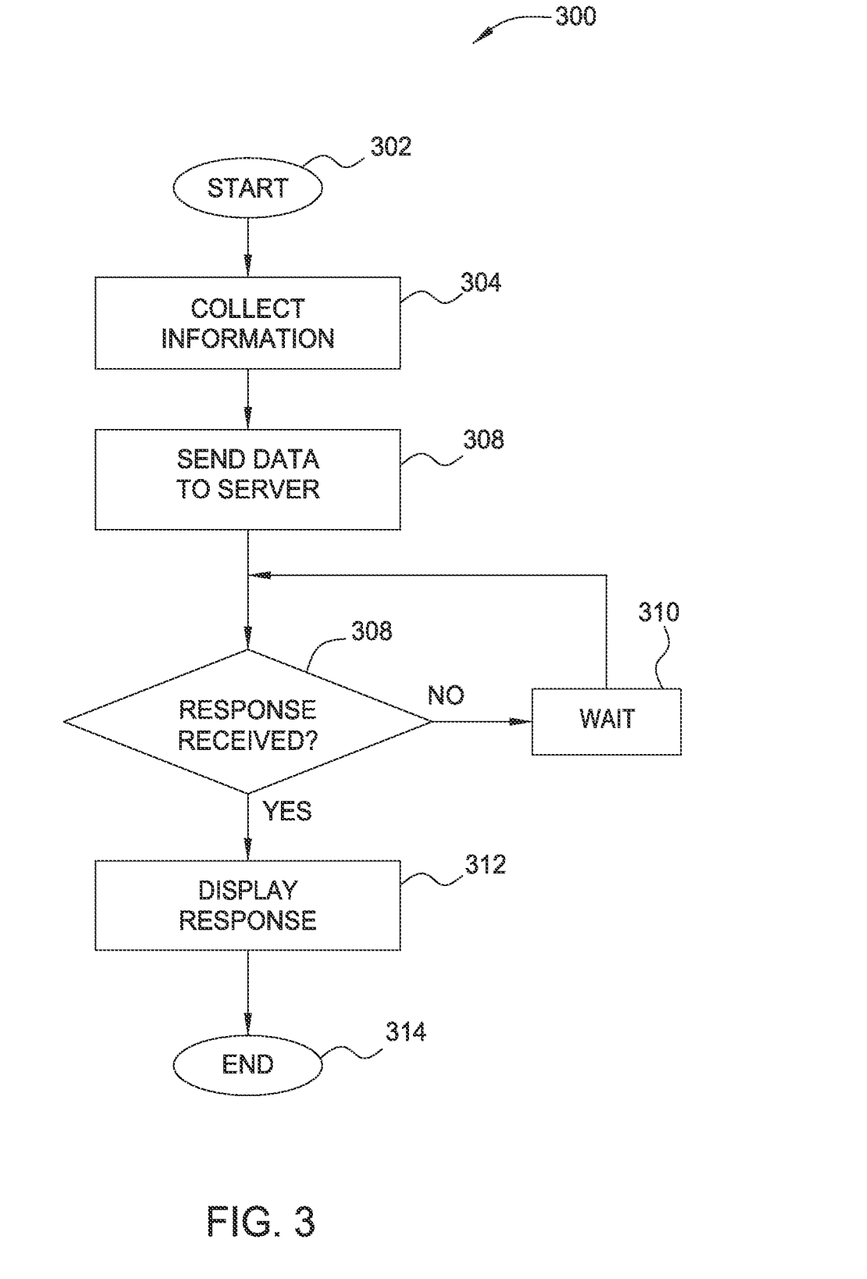
FIG. 3 is a flow chart of a method for collecting sound data and/or scent data on a mobile device, sending the data to a remote server, and displaying a received response, according to at least one aspect.

FIG. 3 illustrates a flow chart for a method 300 that a device used by a vehicle operator or maintenance personnel may follow to provide scent profile and/or sound profile data to a server and to receive an identified cause in return. After the method 300 begins in block 302, the portable device can collect and generate information (e.g., a scent profile, sound profile, and/or picture/video data) in block 304. In various aspects, block 304 comprises generating an entry by a process, such as the method 200 illustrated in FIG. 2. In block 306, the portable device can transmit data to a server. For example, the portable device could transmit the data over a Wi-Fi connection, a cellular data connection, a Bluetooth® wireless connection, other Internet-based transmissions, or any other data transmission protocol. In block 308, the portable device determines whether a response has been received from the server. If no response has been received, then the portable device waits in block 310. Periodically, the device can check again to see if the responses been received in block 308. If a response has been received in block 308, then the portable device can display the response in block 312. The response may identify a cause corresponding to the scent profile and/or sound profile that was transmitted in block 306, and the identified cause can be displayed on a display screen associated with the portable device. In the event that the data sent to the server in block 306 does not correspond to a known fault or other event, then the response could indicate that no match exists, and the displayed response in block 312 could indicate that no match was found. In block 314, the method 300 ends.

Figure 4:
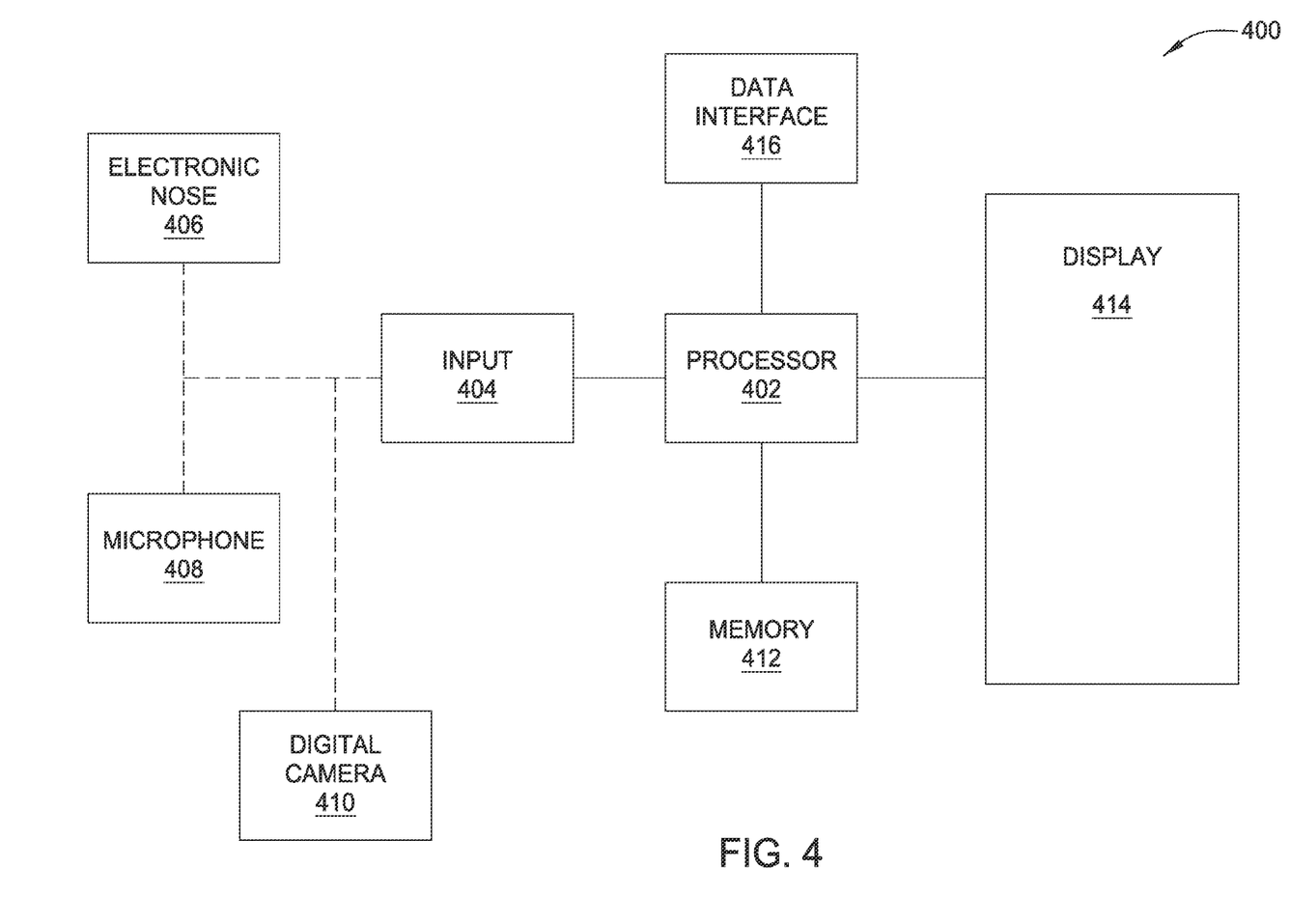
FIG. 4 is a block diagram illustrating components of a system for identifying faults or other events based on a scent and/or sound associated with the event, according to at least one aspect.

FIG. 4 is a block diagram of a system 400 that can receive (or generate) sound profiles and/or scent profiles and retrieve data related to known causes (e.g., failures, faults, or other events) that correspond to the sound profiles and/or scent profiles. The system 400 includes a processor 402 in communication with a computer memory 412. In various aspects, the computer memory 412 can include one or more data structures that store known scent profiles and correspondences with causes for the scent profiles, where applicable. The one or more data structures in the computer memory 412 could also store known sound profiles and correspondences with causes for the known scent profiles, where applicable. In various aspects, the data structures storing the known scent profiles, known sound profiles, and correspondences to causes for the scent and/or sound profiles could be stored on a remote server. The system 400 also includes an input 404 that is operable to receive data from at least one of a microphone 408, an electronic nose 406, and a digital camera 410. In certain aspects, such as a dedicated portable device, the microphone 408, the electronic nose 406, and the digital camera 410 could be built into the system 400. In such aspects, the input 404 could be a data bus or the like that receives inputs from the electronic nose 406, the microphone 408, and the digital camera 410. In various other aspects, such as a smart phone or tablet computer running an application, the microphone 408, the electronic nose 406, and/or the digital camera 410 could be connected to the input 404 via a data cable or via wireless communications protocols (e.g., a Wi-Fi connection, a Bluetooth® wireless connection, a cellular data connection, or any other data communication protocol). For example, the input 404 could be a Wi-Fi or Bluetooth® data connection that can communicate with the electronic nose 406, the microphone 408, and/or the digital camera 410. In certain aspects, the microphone 408 and the digital camera 410 could be built into a portable device, such as smart phone or tablet computer, and the electronic nose 406 could be connected to the input 404 via a wireless or wired connection.

In use, sounds detected by the microphone 408 can be transmitted to the processor 402 via the input 404. The processor can record a sample of the sound to the computer memory 412 and generate a sound profile from the recorded sound sample. Also, scents detected in an air sample by the electronic nose 406 can be transmitted to the processor 402 via the input 404. The processor 402 can generate a scent profile from the detected scents. In the event that the digital camera 410 captures a digital image and/or video associated with the detected sounds and/or detected scents, such images and/or videos can be transmitted to the processor 402 via the input 404. The processor 402 can add the sound profile, scent profile, and/or pictures and videos to an entry (e.g., a maintenance entry, as discussed above with reference to FIG. 2).

In certain aspects, the electronic nose 406, the microphone 408, and/or the digital camera 410 could be physically separate from the system 400. For example, the system 400 could be a server that receives scent profiles generated by the electronic nose 406, sound profiles generated by the microphone 408, and/or pictures/videos captured by the digital camera 410. In such aspects, the input 404 could communicate with the electronic nose 406, the microphone 408, and/or the digital camera 410 via a Wi-Fi connection, Bluetooth® connection, cellular data connection, or any other data transmission protocol. In use, the electronic nose 406 can take air samples and generate scent profiles based on the air samples. The scent profiles can be sent to the processor 402 via the input 404. Also, the microphone 408 can record audio and generate sound profiles based on the audio recordings. The sound profiles can be sent to the processor 402 via the input 404.

The system 400 could also include a data interface 416 in communication the processor 402. The data interface 416 could be a wired Ethernet connection, a Wi-Fi connection, cellular data connection, a Bluetooth® wireless connection, or the like that is operable to communicate with a remote data server. The remote data server could store known sound profiles and correspondences to causes for the sound profiles and could also store known scent profiles and correspondences to causes for the scent profiles. The processor 402 could transmit the entry to the remote data server via the data interface 416. The remote data server could compare sound profiles and/or scent profiles contained in the entry to known sound profiles and/or known scent profiles. In the event that the sound profiles and/or scent profiles contained in the entry match one or more known sound profiles and/or known scent profiles, data related to the causes corresponding to the matched known profiles could be returned to the processor 402 via the data interface 416. As discussed above, in various aspects, the computer memory 412 could store one or more data structures that include known sound profiles and correspondences to causes of the sound profiles and known scent profiles and correspondences to causes of the scent profiles. In such aspects, the data interface 416 may not be needed to communicate with a remote data server to determine whether the sound profiles and/or scent profiles contained in the entry match one or more known sound profiles and/or known scent profiles. Instead, the processor 402 could compare the sound profiles and/or scent profiles contained in the entry to the known sound profiles and/or known scent profiles stored in the computer memory 412. The data interface 416 could still be used in various aspects in which the computer memory 412 stores the known sound profiles and/or known scent profiles. For example, the data interface 416 could periodically communicate with a central server that updates the data structure of known sound profiles and/or known scent profiles based on a community of systems 400 that are deployed across a fleet of vehicles.

The system 400 includes a display 414 in communication with the processor 402. For example, in various aspects in which the system 400 operates on a smart phone or tablet computer device, the display 414 could be a display screen associated with the smart phone or tablet computer. When the processor 402 matches or receives a match between the sound profiles and/or scent profiles contained in the entry and one or more known sound profiles and/or known scent profiles, the processor 402 can retrieve the corresponding fault data and display that fault data on the display 414. A maintenance worker could view the fault data on the display 414 and use the fault data to quickly find the cause of the scent and/or sound.

Figure 5:
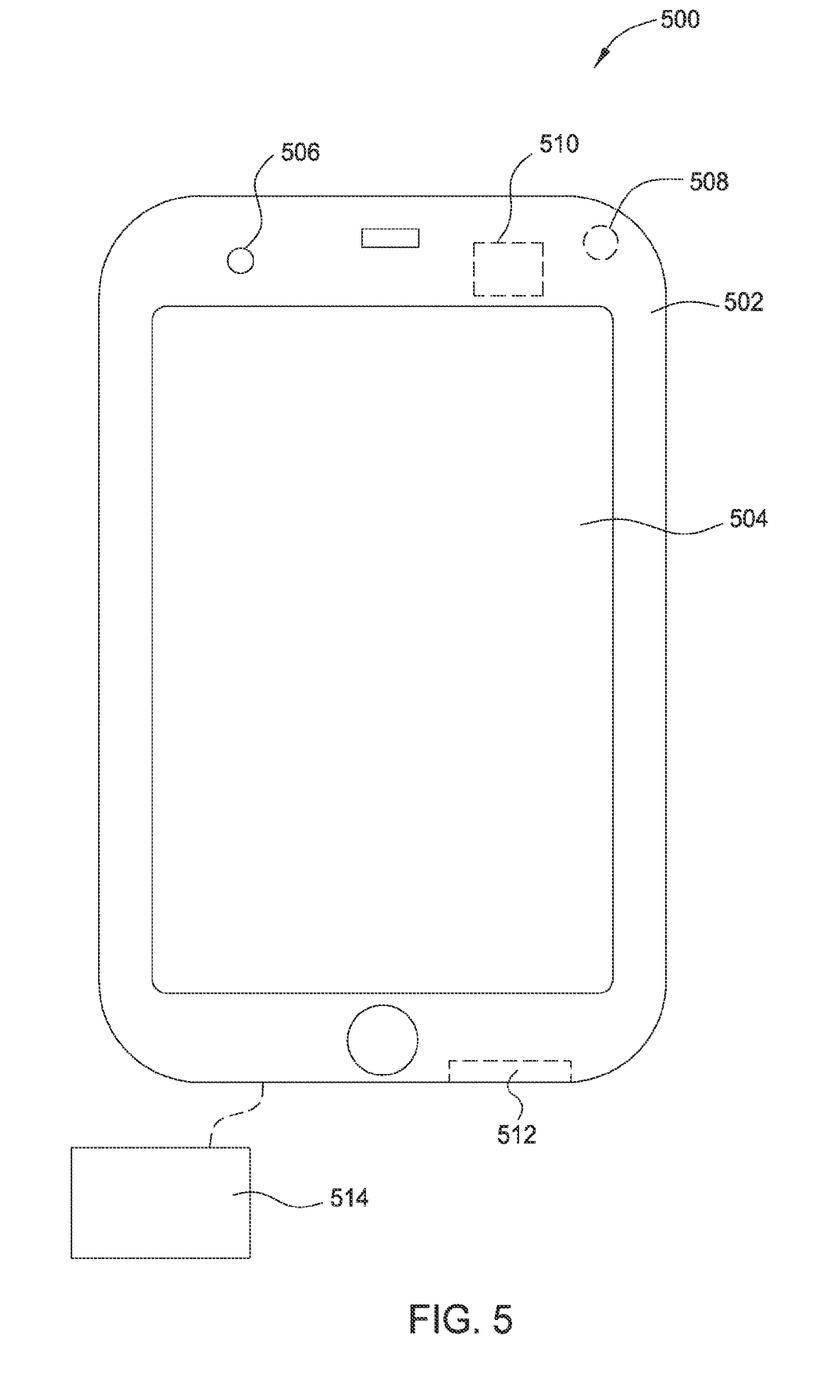
FIG. 5 is a front view of a mobile device that can be used to identify faults or other events based on a scent and/or sound associated with the event, according to at least one aspect.

FIG. 5 illustrates an exemplary aspect of a system 500 in a smart phone or tablet computer device. The system 500 includes a housing 502 with a display screen 504 therein. The display screen 504 could be a touchscreen that allows a user to interact with the system 500. The system 500 also includes one or more cameras. In the exemplary aspect, the system 500 includes a front facing camera 506 arranged on the housing and a rear facing camera 508 on the backside of the housing 502. The front facing camera 506 and/or the rear facing camera 508 can capture digital images and/or digital video. The system 500 also includes a built-in microphone 512 built into the device. For example, the built-in microphone 512 may be used for voice calls (if the system 500 is a smart phone), voice over IP calls (of the system 500 is a tablet computer), or interaction with applications. The built-in microphone 512 could also be used to detect sounds in the environment proximate to the system 500. In various aspects, the built-in microphone 512 may not have adequate fidelity to accurately and/or suitably capture sound for the purposes of creating a sound profile. In such aspects, an external microphone could be attached to the system 500 via a wireless connection (e.g., a Bluetooth® connection or a Wi-Fi connection) or attached to the system 500 via a wired connection. The system 500 also includes an electronic nose module 514. As discussed above, a dedicated portable device may include an electronic nose (e.g., electronic nose module 514) built into the device. A general purpose smart phone or tablet computer is unlikely to have such an electronic nose module 514 built-in. Thus, such an electronic nose would be added as a peripheral via a wired or wireless connection.

In various aspects, the system 500 can include a location module 510, such as a GPS chipset, that can determine a location of the device. In such aspects, a location of the system 500 can be determined when a sound and/or a scent is detected. For example, suppose that a pilot is performing a walk around inspection of an aircraft prior to a flight. During the walk around inspection, the pilot may hear an unfamiliar sound and/or smell an unfamiliar scent. The pilot could use the system 500 (e.g., installed on the pilots personal smart phone device) to record the sound and/or scent. When the sound and/or scent is recorded, the location module 510 could determine a location of the system 500.

The location provided by the location module 510 could be included in the technical log book entry (discussed above with reference to FIG. 2) that is provided to maintenance personnel. The location information could assist the maintenance personnel in identifying a portion of the aircraft to focus their attention on to resolve any issue, faults, event, or the like causing the sound and/or scent. In addition to or as an alternative to GPS, a position could be provided using differential GPS (d-GPS) or another location service such as an iBeacon device. For example, a hanger, garage, gate, or other structure nearby an aircraft or other vehicle could incorporate antenna or the like that transmit location signals. The system 500 could receive these location signals to determine a location or to determine a more accurate location of the system 500.

Figure 6:
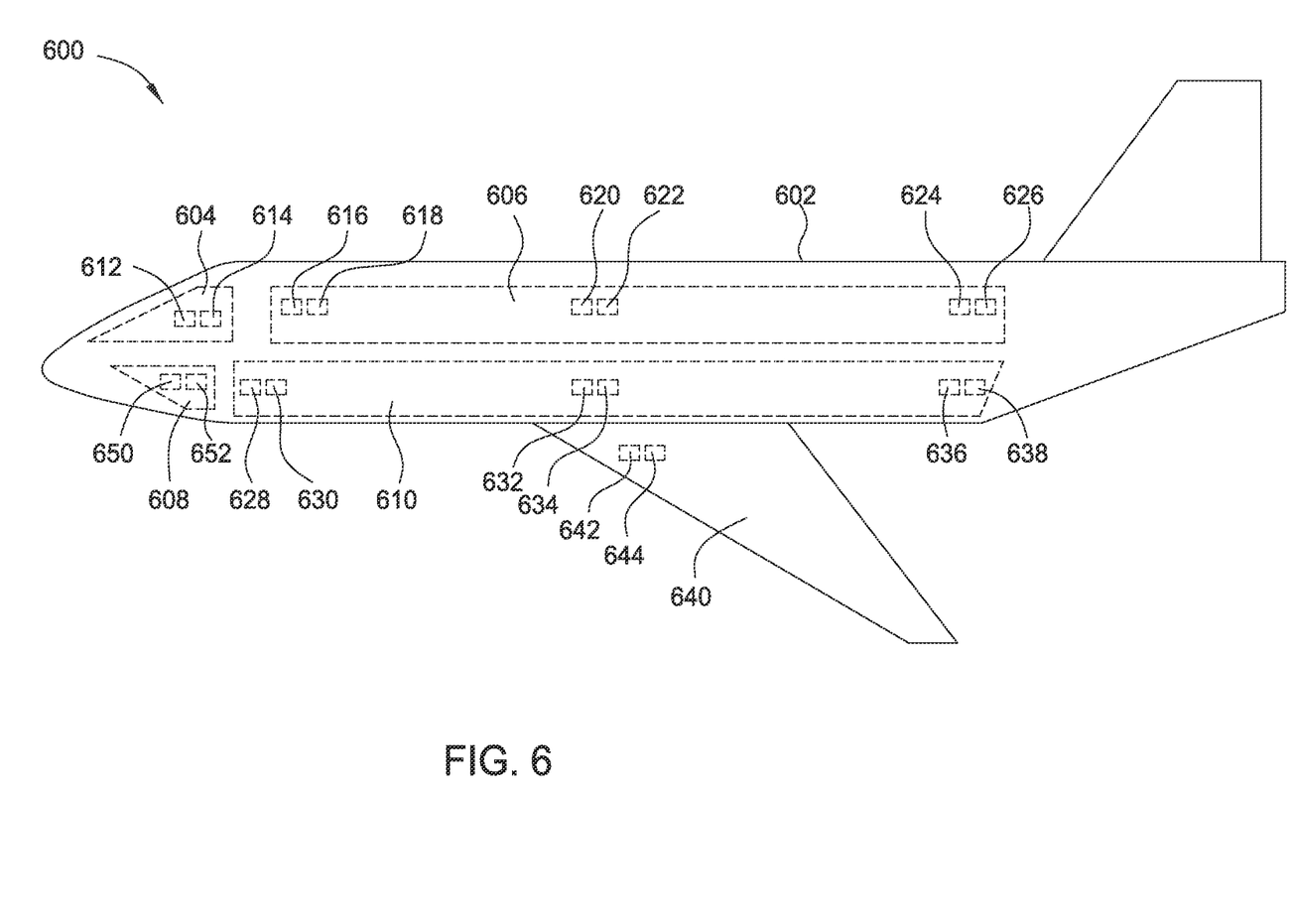
FIG. 6 is a side schematic view of an aircraft according to at least one aspect, wherein the aircraft includes various compartments with dedicated scent and sound sensors arranged in the compartments.

FIG. 6 illustrates an exemplary aspect in which an aircraft 600 incorporates microphones and/or electronic noses throughout various locations and volumes in a fuselage 602 of the aircraft 600. For example, the aircraft 600 includes a microphone 612 and an electronic nose 614 in the cockpit 604 of the aircraft. The aircraft 600 also includes three sets of microphones and electronic noses in a passenger cabin 606 of the aircraft. A first microphone 616 and first electronic nose 618 are arranged in a forward section of the passenger cabin 606, a second microphone 620 and second electronic nose 622 are located in a midsection of the passenger cabin 606, and a third microphone 624 and third electronic nose 626 are arranged in an aft section of the passenger cabin 606. The aircraft 600 also includes a microphone 650 and an electronic nose 652 arranged an equipment bay 608 of the aircraft. The aircraft 600 also includes three sets of microphones and electronic noses in a cargo bay. For example, a first microphone 628 and a first electronic nose 630 are arranged in the forward section of the cargo bay 610, a second microphone 632 and a second electronic 634 are arranged in a midsection of the cargo bay 610, and a third microphone 636 and a third electronic nose 638 are arranged in an aft section of the cargo bay 610. Generally, spaces such as the equipment bay 608 and the cargo bay 610 are unoccupied during flights of the aircraft 600. The microphones and electronic noses arranged in these sections may detect sounds and/or scents that would not be detected by pilots, maintenance personnel, baggage handlers, such as between flight operations when such personnel occupy these sections. As a result, potential faults may be detected earlier by the presence of such microphones and electronic noses.

The aircraft 600 can also include microphones and/or electronic noses in regions of the aircraft that are not regularly accessible by human operators. For example, the wing 640 of the aircraft 600 may include compartments or volumes that include wiring, hydraulic lines, and other systems, which are occasionally inspected by maintenance personnel or the like. A microphone 642 and an electronic nose 644 could be incorporated into such cavities or volumes in the wing 640 (or other regions of the aircraft) to provide additional fault detection in those areas.

In the aspects above, correspondences between known scent profiles and faults and/or known sound profiles and faults are stored in a data structure, such as the database 106 shown in FIG. 1 or the computer memory 412 shown in FIG. 4. For example, a particular scent and/or sound profile could be associated with a particular system and/or area in an aircraft. For example, a particular scent may be associated with wiring insulation burning or with hydraulic fluid. In various aspects, the scent and/or sound profile may be associated with a particular area of the aircraft if it could only be encountered in that area. For example, a particular wiring insulation may only be used in the aircraft behind particular panels in the cockpit. A scent profile of that wiring insulation burning therefore could be associated with the cockpit or with the particular panels in the cockpit. The correspondences stored in the data structure can be increased over time. For example, if a new scent and/or sound is encountered (in a vehicle), new profile(s) for the new scent and/or sound can be added to the data structure. If and when a cause of the new scent and/or sound is discovered, a description of the cause can be added to the data structure along with a correspondence between the new profile(s) and the description of the cause. Additionally, a location or system associated with the newly-discovered cause can be added to the data structure.

Referring again to FIG. 4, in various aspects, the display 414 could be a touch screen display that maintenance personnel could use the enter causes and/or locations associated with a scent and/or sound profile that is lacking correspondences. In various aspects, one or more input devices (e.g., a computer keyboard, a computer mouse, a touch pad, and an electronic pen) could be used to enter causes and/or locations associated with a scent and/or sound profile that is lacking correspondences.

In various aspects, the sound and/or scent profiles could correspond to a vehicle condition. For example, a water-cooled piston engine could develop a crack in the engine block that allows water and/or antifreeze to mix with engine oil. The combination of water, antifreeze, and oil could result in a unique scent profile. The unique scent profile could be associated with (i.e., correspond to) an event, such as "engine oil mixed with water and/or anti-freeze." The unique scent profile could also be associated with an event that identifies the likely vehicle condition, such as "engine oil mixed with water and/or anti-freeze due to a cracked engine block." Similar vehicle conditions could be identified for other vehicle types. For example, a scent profile of engine oil in the passenger cabin of a turbine aircraft could be associated with a vehicle condition, such as "leaking bearing seal in engine."

By providing a system that can objectively quantify sounds and/or scents, it could be possible to design components for vehicles or other systems that would result in distinctive sounds and/or scents in the event of a failure. For example, wire insulation could be impregnated with particular chemical compounds that would be released in the event that the wiring insulation began to burn. By providing different chemical compounds in different wires (e.g., wires for different systems having different chemical compounds), a detected scent profile including a particular chemical compound would identify the system that has wiring with that particular chemical compound.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects described herein may take the form of an entirely hardware aspect, an entirely software aspect (including firmware, resident software, micro-code, etc.) or an aspect combining software and hardware aspects that may all generally be referred to herein as a "circuit," "module" or "system."

Various aspects may be a system, a method, and/or a computer program product. The computer program product may include a computer readable storage medium (or media) having computer readable program instructions thereon for causing a processor to carry out various aspects.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform various aspects.

Aspects are described herein with reference to flowchart illustrations and/or block diagrams of methods, apparatus (systems), and computer program products according to various aspects. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the aspects disclosed herein, a user may access applications (e.g., an application to match scent and/or sound profiles contained in a maintenance entry to known scent and/or sound profiles) or related data available in the cloud. For example, the scent and/or sound matching application could execute on a computing system in the cloud by receiving a scent and/or sound profile contained in an entry, comparing the received scent and/or sound profile in the entry to known scent and/or sound profiles, and returning causes for the scent and/or sound profiles corresponding to the matched, known scent and/or sound profiles. In such a case, the scent and/or sound matching application could compare a received scent and/or sound profile to known scent and/or sound profiles and store matched, known scent and/or sound profile(s) and corresponding causes for the matched, known scent and/or sound profile(s) at a storage location in the cloud. Doing so allows a user to access this information from any computing system attached to a network connected to the cloud (e.g., the Internet).

While the foregoing is directed to various aspects, other and further aspects may be devised without departing from the basic scope thereof, and the scope thereof is determined by the claims that follow.

What is claimed is:

1. A system for diagnosing events, the system comprising: an input operable to receive electronic data that includes a scent profile; a computer-readable storage medium that stores a data structure, wherein the data structure stores known scent profiles and correspondences between known scent profiles and known events; a computer processor operable to: search the data structure for at least one known scent profile that matches a received scent profile; and upon finding a match between a known scent profile and the received scent profile, output to a display an indication of one or more events corresponding to the matched known scent profile; the display communicatively coupled to the computer processor.

2. The system of claim 1, wherein the input is further operable to receive electronic data that includes a sound profile; wherein the data structure stores known sound profiles and correspondences between known sound profiles and known events; and wherein the computer processor is further operable to:
search the data structure for at least one known sound profile that matches a received sound profile; and
upon finding a match between a known sound profile and the received sound profile, output to the display an indication of one or more events corresponding to the matched known sound profile.

3. The system of claim 2, wherein the computer processor is further operable to store at least one of the received scent profile and the received sound profile in the data structure upon the at least one of the received scent profile and the received sound profile not matching at least one of a stored known scent profile and a stored known sound profile.

4. The system of claim 3, further comprising receiving an identification of an event for at least one of the received scent profile and the received sound profile that does not match at least one of a stored known scent profile and a stored known sound profile; and
wherein the computer processor is further operable to store the identification of the event in the data structure and to create a correspondence between the identification of the event and the at least one of the received scent profile and the received sound profile not matching at least one of a stored known scent profile and a stored known sound profile.

5. The system of claim 2, further comprising a portable device that includes:
a microphone module operable to detect sound waves and generate a sound profile for the sound waves;
an electronic nose module operable to sample an air volume and generate a scent profile for the air volume; and
transmit electronic data that includes at least one of a generated sound profile and a generated scent profile to the input.

6. The system of claim 5, further comprising a digital camera operable to capture at least one of a digital picture and a digital video of a location corresponding to at least one of detected sound waves and a sampled air volume.

7. The system of claim 6, wherein the computer processor is further operable to automatically capture at least one of a digital picture and a digital video of a location where the detected sound waves are the loudest or where a scent detected in the air volume is the strongest.

8. The system of claim 2, wherein the computer processor is further operable to order replacement component upon the event corresponding to at least one of a matched known scent profile and a matched sound profile being a component failure.

9. The system of claim 2, wherein the computer processor is further operable to output repair instructions to the display upon the event corresponding to at least one of a matched known scent profile and a matched sound profile being a component failure.

10. The system of claim 2, further comprising an aircraft, wherein the aircraft includes at least a first volume and a second volume, wherein the first volume comprises a first microphone module operable to detect first sound waves and generate a sound profile for the first sound waves and a first electronic nose module operable to sample the first volume and generate a scent profile for the first volume, and wherein the second volume comprises a second microphone module operable to detect second sound waves and generate a sound profile for the second sound waves and a second electronic nose module operable to sample the second volume and generate a scent profile for the second volume.

11. The system of claim 10, wherein the first volume comprises one of a flight deck, passenger cabin, equipment bay, cargo bay, and a volume in a flight surface structure.

12. A computer-implemented method, comprising:
receiving electronic data that includes a scent profile;
comparing the received scent profile to electronic data in a data structure containing known scent; and upon finding a match between a known scent profile and the received scent profile, outputting an indication of one or more events corresponding to the matched known scent profile.

13. The computer-implemented method of claim 12, further comprising:
receiving electronic data that includes a sound profile;
comparing the received sound profile to electronic data in the data structure, wherein the data structure contains known sound profiles;
upon finding a match between a known sound profile and the received sound profile, outputting an indication of one or more events corresponding to the matched known sound profile.

14. The computer-implemented method of claim 13, wherein the method further comprises storing at least one of the received scent profile and the received sound profile in the data structure upon the at least one of the received scent profile and the received sound profile not matching at least one of a stored known scent profile and a stored known sound profile.

15. The computer-implemented method of claim 14, further comprising receiving an identification of a event for at least one of the received scent profile and the received sound profile that does not match at least one of a stored known scent profile and a stored known sound profile; and
storing the identification of the event in the data structure and creating a correspondence between the identification of the event and the at least one of the received scent profile and the received sound profile not matching at least one of a stored known scent profile and a stored known sound profile.

16. The computer-implemented method of claim 12, further comprising:
sampling sound waves and generating the sound profile from the sound waves;
sampling an air volume and generate the scent profile from the air volume; and
transmitting electronic data that includes at least one of a generated sound profile and a generated scent profile.

17. The computer-implemented method of claim 12, wherein receiving electronic data that includes at least one of a scent profile and a sound profile comprises receiving at least one of a scent profile and a sound profile from a vehicle; and
wherein the one or more events corresponding to the matched known scent profile corresponds to a vehicle condition, and wherein the one or more events corresponding to the matched known sound profile corresponds to a vehicle condition.

18. A computer program product for diagnosing events, the computer program product comprising:
a computer-readable storage medium having computer-readable program code embodied therewith, the computer-readable program code executable by one or more computer processors to:
receive electronic data that includes a scent profile;
compare the received scent profile to electronic data in a data structure containing known scent profiles; and
upon finding a match between a known scent profile and the received scent profile, output an indication of one or more events corresponding to the matched known scent profile.

19. The computer program product of claim 18, wherein the computer-readable program code is further executable to:
receive electronic data that includes a sound profile;
compare the received sound profile to electronic data in the data structure, wherein the data structure includes known sound profiles; and
upon finding a match between a known sound profile and the received sound profile, output an indication of one or more events corresponding to the matched known sound profile.

20. The computer program product of claim 19, wherein the computer-readable program code is further executable to store at least one of the received scent profile and the received sound profile in the data structure upon the at least one of the received scent profile and the received sound profile not matching at least one of a stored known scent profile and a stored known sound profile.

* * * * *

UNITED STATES PATENT AND TRADEMARK OFFICE
CERTIFICATE OF CORRECTION

PATENT NO. : 9,643,737 B2  
APPLICATION NO. : 14/830380  
DATED : May 9, 2017  
INVENTOR(S) : Nima Barraci et al.

Page 1 of 1

It is certified that error appears in the above-identified patent and that said Letters Patent is hereby corrected as shown below:

On the Title Page

In item (54) and in the Specification, in Column 1, Lines 1-2, in "Title", delete "SOUND AND SCENT SEARCH ENGINE FOR MECHANICS" and insert -- SOUND AND SCENT SEARCH ENGINE --, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*